(12) United States Patent
Cooper et al.

(10) Patent No.: US 8,958,541 B1
(45) Date of Patent: Feb. 17, 2015

(54) INTELLIGENT NETWORK-BASED VOICE AND DATA RECORDING

(75) Inventors: Brian Cooper, Valley, NE (US); Douglas W. Stevens, Naperville, IL (US); Eileen Kaye Boroski, Tracyville (CA)

(73) Assignee: West Corporation, Omaha, NE (US)

( * ) Notice: Subject to any disclaimer, the term of this patent is extended or adjusted under 35 U.S.C. 154(b) by 1092 days.

(21) Appl. No.: 12/716,404

(22) Filed: Mar. 3, 2010

(51) Int. Cl.
*H04M 3/00* (2006.01)

(52) U.S. Cl.
USPC ........................................ 379/265.03; 379/68

(58) Field of Classification Search
CPC . H02M 3/42221; H02M 3/51; H02M 3/5166; H02M 3/5175; H02M 3/5183; H02M 3/5191; H02M 3/523; H02M 3/5237; H02M 1/276; H02M 1/64; H02M 1/65; H02M 1/6515; H02M 1/654; H02M 1/6505; H02M 1/656; H02M 1/72572; H02M 2203/301; H02M 2203/40; H02M 2203/401; H02M 2203/402; H02M 2203/407
USPC ............... 379/68, 81, 84, 85, 265.01, 265.02, 379/265.03, 265.06, 265.09, 266.1
See application file for complete search history.

(56) References Cited

U.S. PATENT DOCUMENTS

| | | | |
|---|---|---|---|
| 2006/0256953 A1* | 11/2006 | Pulaski et al. | 379/265.06 |
| 2008/0152122 A1* | 6/2008 | Idan et al. | 379/265.07 |
| 2012/0030130 A1* | 2/2012 | Smith et al. | 705/325 |

* cited by examiner

*Primary Examiner* — Antim Shah

(57) ABSTRACT

A method, a system, and computer readable medium comprising instructions for intelligent network-based voice and data recording are provided. A recording of a call from a caller to an agent is initiated. The recording of the call is stored in a voice server. Analysis on voice and data of the recording is performed. A supervisor of the agent is notified of a result of the analysis.

16 Claims, 5 Drawing Sheets

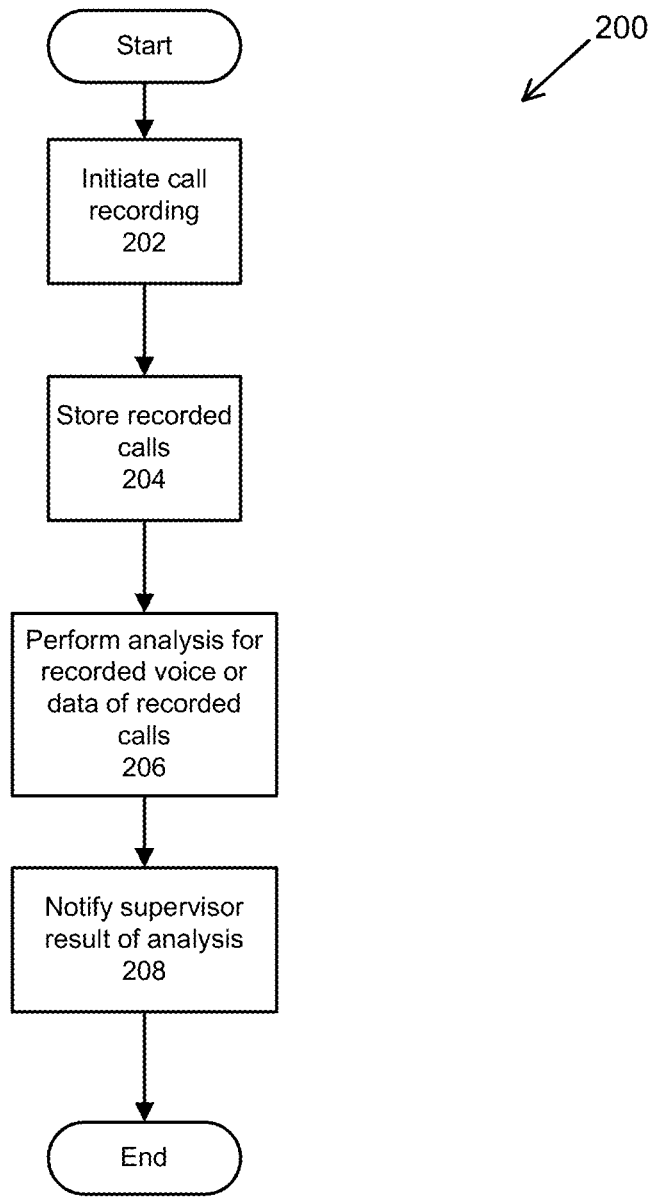

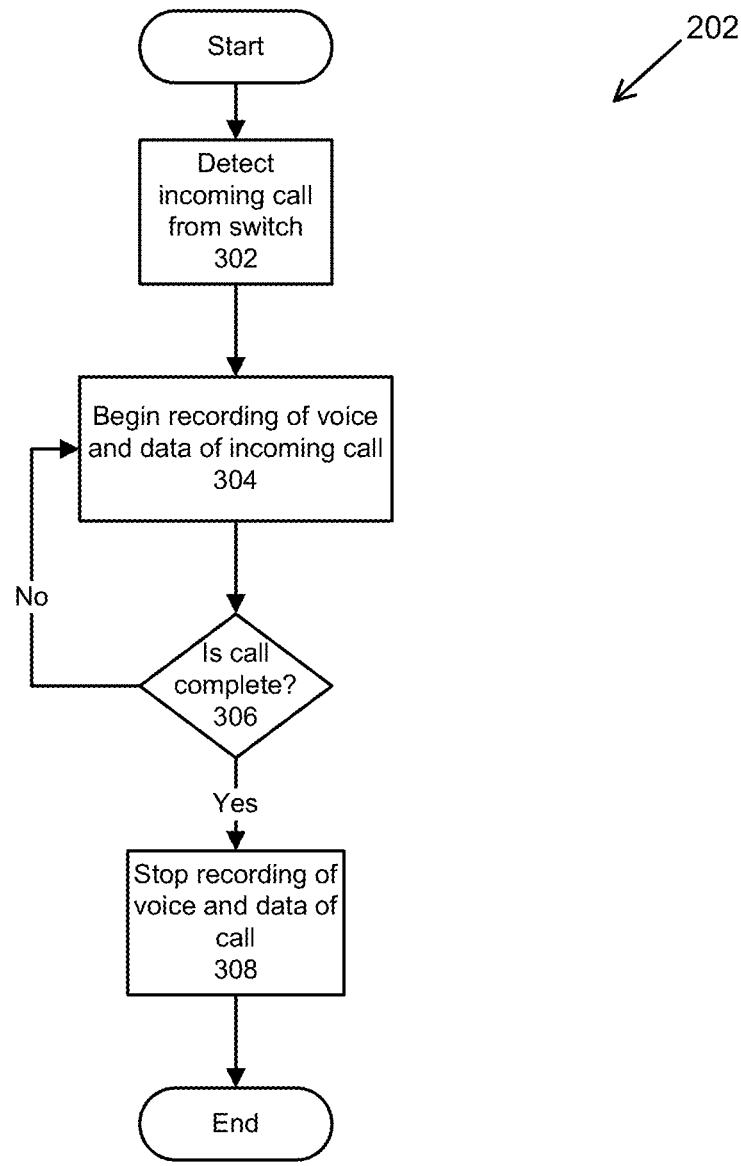

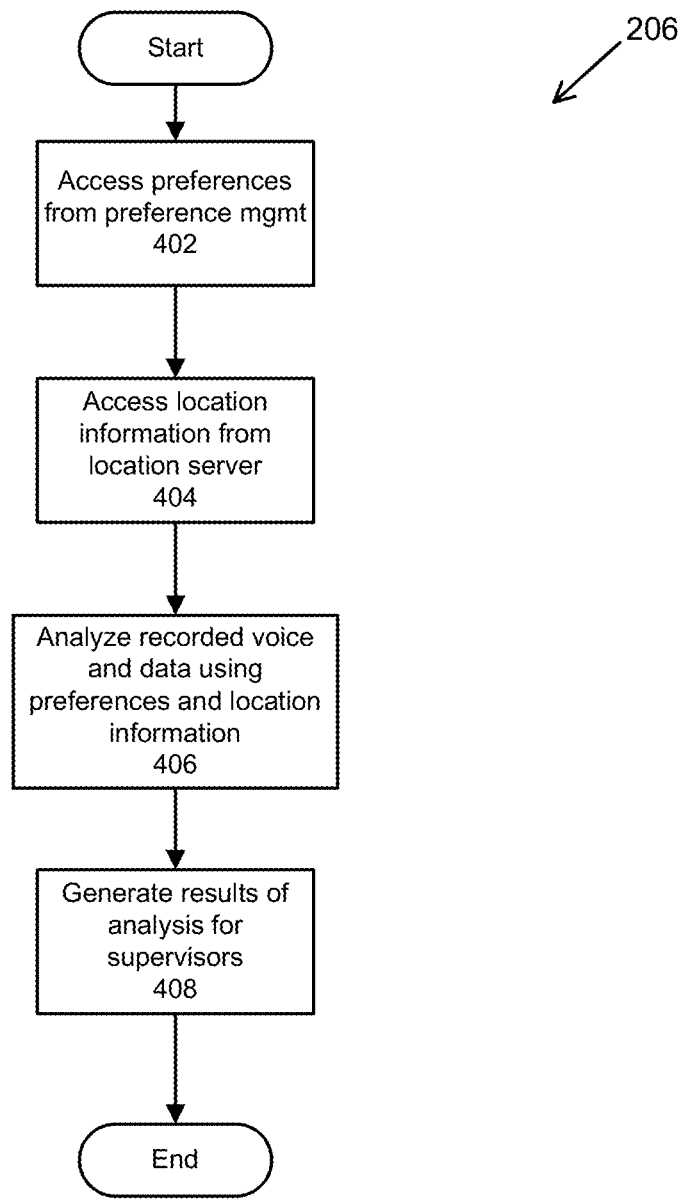

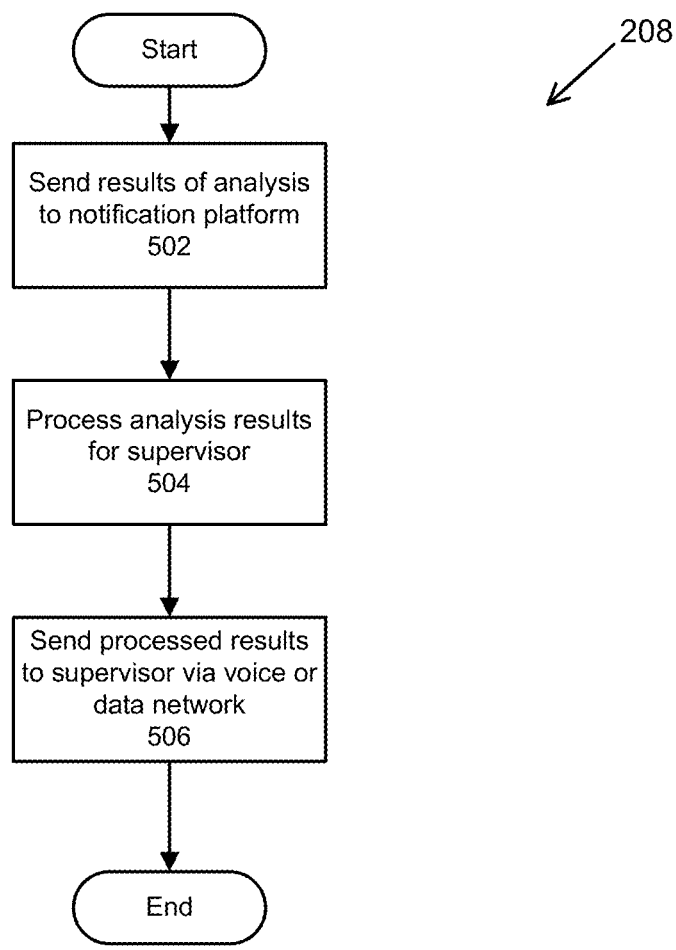

INTELLIGENT NETWORK-BASED VOICE AND DATA RECORDING

FIELD OF THE DISCLOSURE

The present disclosure relates generally to an intelligent voice and data network. Still particularly, the present disclosure provides a method, a system, and a computer readable medium comprising instructions for intelligent network-based voice and data recording.

BACKGROUND OF THE DISCLOSURE

Historically, management and communications with a large employee workforce has been a complex and time-consuming task. With regard to managing large groups of employees, it is difficult to monitor their work quality and assure that it meets quality objectives. In order to monitor work quality of employees, voice and data associated with work of employees are recorded for supervisors to review. However, it is often difficult to provide one hundred percent voice and data recording. This is due to limited resources available to process the recording.

In addition to recording the work of employees, monitoring their work quality may include performing analysis of employee voice data. For example, whether the employees' speed of speech comply with the standard and whether their tones of voice comply with customer service objective, etc. Therefore, what is needed is an intelligent voice and data recording system that not only provides full recording of employee voice and data, but also performs analysis of recorded voice and data for supervisors.

SUMMARY OF THE DISCLOSURE

A method, a system, and computer readable medium comprising instructions for intelligent network-based voice and data recording are provided. A recording of a call from a caller to an agent is initiated. The recording of the call is stored in a voice server. Analysis on voice and data of the recording is performed. A supervisor of the agent is notified of a result of the analysis.

To initiate recording of the call, the call is detected from a switch. Recording of voice and data of the call is begun. A determination is made as to whether the call is complete. The recording of voice and data of the call is continued if the call is not complete. The recording of voice and data of the call is stopped if the call is complete.

To perform analysis of the recording, at least one preference is accessed from a preference management system. A location information is accessed from a location server. The voice and data of the call is analyzed using the preference and location information. A result of the analysis is generated for the supervisor.

To notify the supervisor, the result of the analysis is sent to a notification platform. The result is processed for the supervisor. The processed result is sent to the supervisor.

BRIEF DESCRIPTION OF THE DRAWINGS

FIG. 2 depicts a flowchart of a process for intelligent network-based voice and data recording in accordance with one embodiment of the present disclosure;

FIG. 3 depicts a flowchart of a process for initiating call recording in accordance with one embodiment of the present disclosure;

FIG. 4 depicts a flowchart of a process for performing analysis for recorded voice and data of the recorded calls in accordance with one embodiment of the present disclosure; and FIG. 5 depicts a flowchart of a process for notifying supervisors of results of analysis in accordance with one embodiment of the present disclosure.

DETAILED DESCRIPTION OF THE INVENTION

Figure 1:
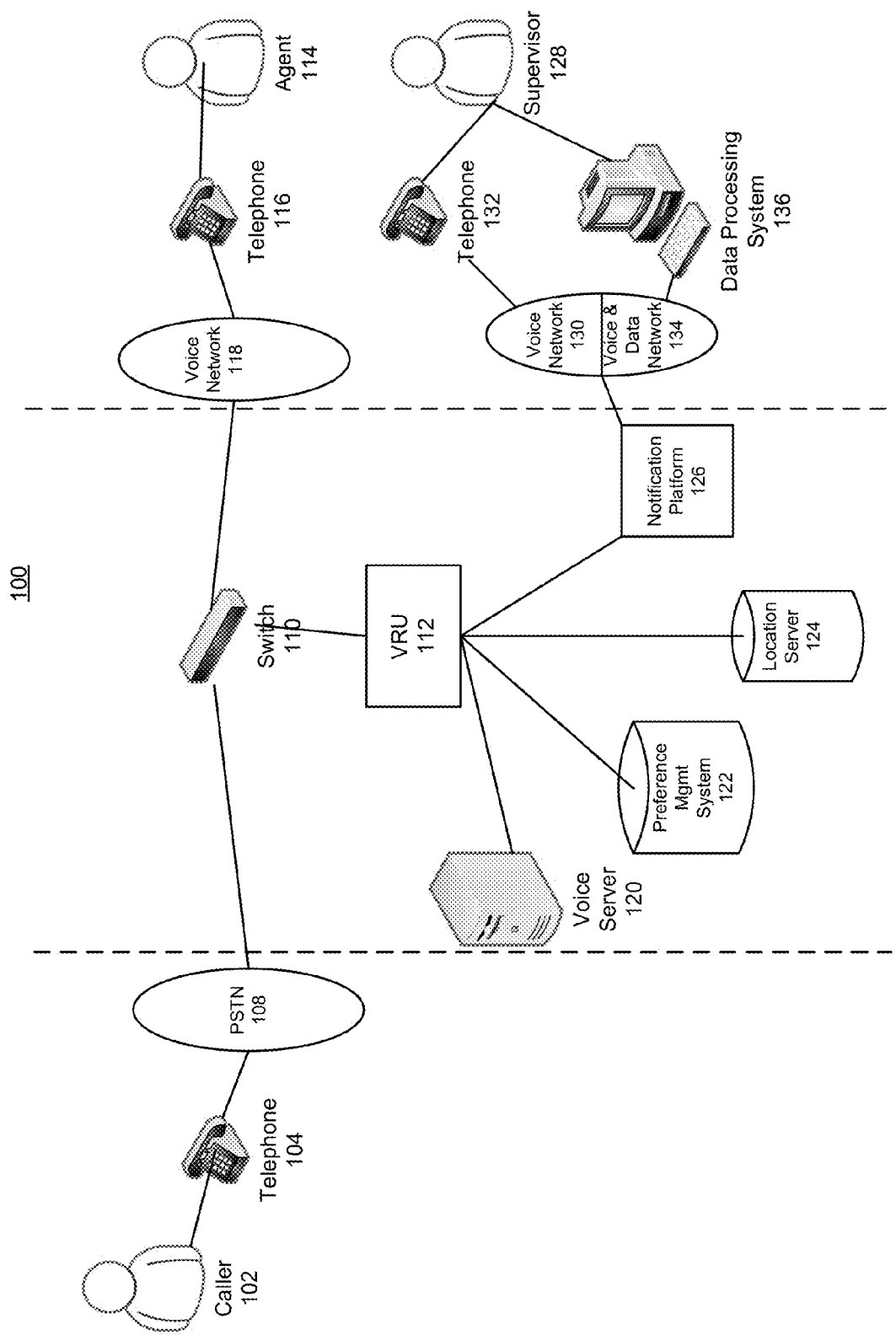
FIG. 1 depicts a diagram of a system for message delivery security validation in accordance with one embodiment of the present disclosure.

With reference to the figures and in particular with reference to FIG. 1, a diagram of a system for intelligent network-based voice and data recording is depicted in accordance with one embodiment of the present disclosure. In intelligent voice and data network 100, caller 102 initiates a call using a telephone 104. The call arrives at switch 110 via the public switch telephone network 108 for routing.

In turn, switch 110 sends the received call to a voice response unit (VRU) 112 provided by the present disclosure. VRU 112 is responsible for managing voice and data recording and storage in intelligent voice and data network 100. In one embodiment, the VRU 112 starts voice and data recording before the switch 110 routes the call to agent 114. The call may be routed to a telephone 116 of the agent 114 via a voice network 118.

Once the call recording is initiated, the recorded call may be stored in one or more voice server 120. Voice server 120 may be a scalable server capable of accommodating expanding voice and data recording. After the call is recorded and stored, the voice response unit 112 may retrieve the recorded data or voice from the voice server 120 and performs analysis. In one embodiment, the voice response unit 112 may determine preferences of the call handled by the agent from preference management system. In addition, the voice response unit 112 may retrieve location information of caller from location server 124 which is configured to make decisions based on at least one of: the location of the caller, the location of the agent or the location of the supervisor. With preference information and location information, the voice response unit may perform analysis of the recorded voice and data. The voice response unit 112 may perform analysis of the recorded voice and data in terms of recording compliance to standards, business analytics, auditing, and legal standards.

Once the analysis is performed, the voice response unit 112 may send the results to a notification platform 126. The notification platform 126 may process the results of the analysis, for example, to present the results in a form of a customer satisfaction survey. In one embodiment, the results are based on preferences that the supervisor has defined. The notification platform 126 may then notify the supervisor 128 of the results. In one embodiment, the notification platform 126 sends the result via a voice network 130 to a telephone 132 of the supervisor 128. Alternatively, the notification platform 126 sends the result via a voice and data network 134 to a data processing system 136, which is capable of displaying the results to the supervisor 128. Data processing system 136 may be a laptop computer, a desktop computer, or other types of system capable of sending and receiving information via a wired or wireless protocol.

Referring to FIG. 2, a flowchart of a process for intelligent network-based voice and data recording is depicted in accordance with one embodiment of the present disclosure. Process 300 may be implemented as computer instructions embodied in a computer readable medium. In this embodiment, process 300 may be implemented as computer instructions executing within voice response unit 112 in FIG. 1.

Process 200 begins at step 202 to initiate recording of incoming calls from the caller. In one embodiment, the call is received at the switch and sent to the voice response unit for recording. Once call recording is initiated, process 200 continues to step 204 to store recorded calls in a voice server. Once the calls are stored, process 200 continues to step 206 to perform analysis on the recorded voice or data of the recorded calls. Once the analysis is performed, process 200 continues to step 208 to notify supervisor results of the analysis. In another embodiment, the location server lookup can be used. In such a situation, and based on the defined preferences, the location server will determine which supervisor(s) of one or more supervisors, receives the results of the analysis.

Referring to FIG. 3, a flowchart of a process for initiating call recording is depicted in accordance with one embodiment of the present disclosure. Process 202 may be implemented as computer instructions embodied in a computer readable medium. In this embodiment, process 202 may be implemented as computer instructions executing within voice response unit 112 in FIG. 1.

Process 202 begins at step 302 to detect an incoming call from the switch, in response to receiving an incoming call from a caller. Process 202 then continues to step 304 to begin recording of voice and data of the incoming call. Process 202 then continues to step 306 to determine if the call is complete. If the call is not complete, process 202 returns to step 304 to continue recording of voice and data of the incoming call. If the call is complete, process 202 completes at step 308 to stop recording voice and data of the incoming call.

Referring to FIG. 4, a flowchart of a process for performing analysis for recorded voice and data of the recorded calls is depicted in accordance with one embodiment of the present disclosure. Process 206 may be implemented as computer instructions embodied in a computer readable medium. In this embodiment, process 206 may be implemented as computer instructions executing within voice response unit 112 in FIG. 1.

Process 206 begins at step 402 to access preferences of calls from a preference management system. Process 206 then continues to step 404 to access location information of the caller from a location server. Process 206 then continues to analyze the recorded voice and data using the preferences from the preference management system and location information from the location server. Process 206 then completes at step 408 to generate results of analysis for supervisors.

Referring to FIG. 5, a flowchart of a process for notifying supervisors of results of analysis is depicted in accordance with one embodiment of the present disclosure. Process 208 may be implemented as computer instructions embodied in a computer readable medium.

Process 208 begins at step 502 to send results of the analysis to the notification platform. Process 208 then continues to step 504 to process the analysis results for the supervisor. For example, the results may be formatted as a customer satisfaction survey or other types of report for the supervisor. Process 208 then completes at step 506 to send the processed result to the supervisor. In one embodiment, the notification platform sends the processed results via a voice and data network to a data processing system of the supervisor. In an alternative embodiment, the notification platform sends the processed results to a telephone of the supervisor via a voice network. In another embodiment, process 208 can continue to an alternate step 504 to generate a report based on the supervisor preference lookup.

In summary, the present disclosure provides intelligent network-based voice and data recording of calls initiated from a caller to an agent. By providing recording of voice and data of incoming calls and storage of the recording in a voice server, limited network-based recording capabilities may be overcome. In addition, by providing analysis of voice and data of the recording, work quality of the agent may be automatically analyzed for quality assurance and legal compliance. Furthermore, business analytics of the voice and data of the recording may be performed for the supervisor.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method for intelligent network-based voice and data recording comprising:
   initiating recording of a call from a caller to an agent;
   storing the recording of the call;
   performing analysis on voice and data of the recording; and
   notifying a supervisor of the agent a result of the analysis;
   wherein performing analysis on the voice and the data of the recording comprises accessing at least one supervisor preference from a preference management system;
   accessing a location information from a location server;
   analyzing voice and data of the call using the preference and the location information; and
   generating a result of the analysis for the supervisor.

2. The method of claim 1, wherein initiating recording of the call comprises:
   detecting the call from a switch;
   beginning recording of voice and data of the call; and
   determining of the call is complete.

3. The method of claim 2, further comprising:
   continuing recording of voice and data of the call if the call is not complete.

4. The method of claim 2, further comprising:
   stopping recording of voice and data of the call if the call is complete.

5. The method of claim 1, wherein storing the recording of the call comprises:
   storing voice and data of the recording in a voice server.

6. The method of claim 1, wherein notifying a supervisor of the agent a result of the analysis comprises:
   sending the result of the analysis to a notification platform;
   processing the result for the supervisor; and
   sending the processed result to the supervisor.

7. The method of claim 6, wherein processing the result for the supervisor comprises:
   generating a customer satisfaction survey based on the result of the analysis.

8. The method of claim 6, wherein sending the processed result to the supervisor comprises:
   sending the processed result to a data processing system of the supervisor via a voice and data network.

9. The method of claim 6, wherein sending the processed result to the supervisor comprises:
   sending the processed result to a telephone of the supervisor via a voice network.

10. A system for intelligent network-based voice and data recording comprising:

a switch communicably coupled to a caller via a voice network;

a voice response unit communicably coupled to the switch;

a voice server communicably coupled to the voice response unit;

a notification platform communicably coupled to the voice response unit and a supervisor via a voice and data network; and a preference management system communicably coupled to the voice response unit, wherein the preference management system comprises at least one preference;

wherein the voice response unit is operable to perform analysis of the recording based on the at least one preference;

wherein the switch is operable to receive a call from the caller to an agent and send the call to the voice response unit; and wherein the voice response unit is operable to initiate recording of the call, store the recording in the voice server, perform analysis of voice and data of the recording, and notify the supervisor a result of the analysis.

11. The system of claim 10, wherein the voice response unit is further operable to detect the call from the switch, begin recording voice and data of the call, determine if the call is complete, and stop recording voice and data of the call if the call is complete.

12. The system of claim 10, further comprising a location server communicably coupled to the voice response unit, the location server comprising at least one location information.

13. The system of claim 12, wherein the voice response unit is operable to perform analysis of the recording based on the at least one location information.

14. The system of claim 13, wherein the voice response unit is operable to send a result of analysis to the notification platform.

15. The system of claim 10, wherein the voice response unit is operable to process the result of the analysis for the supervisor and send the processed result to the supervisor.

16. A non-transitory computer readable medium comprising instructions for:

initiating recording of a call from a caller to an agent;

storing the recording of the call;

performing analysis on voice and data of the recording; and notifying a supervisor of the agent a result of the analysis;

wherein performing analysis on the voice and the data of the recording comprises accessing at least one supervisor preference from a preference management system;

accessing a location information from a location server;

analyzing voice and data of the call using the preference and the location information; and generating a result of the analysis for the supervisor.

* * * * *